A. BECKERS.
Stereoscope.
No. 24,855.  Patented July 26, 1859.
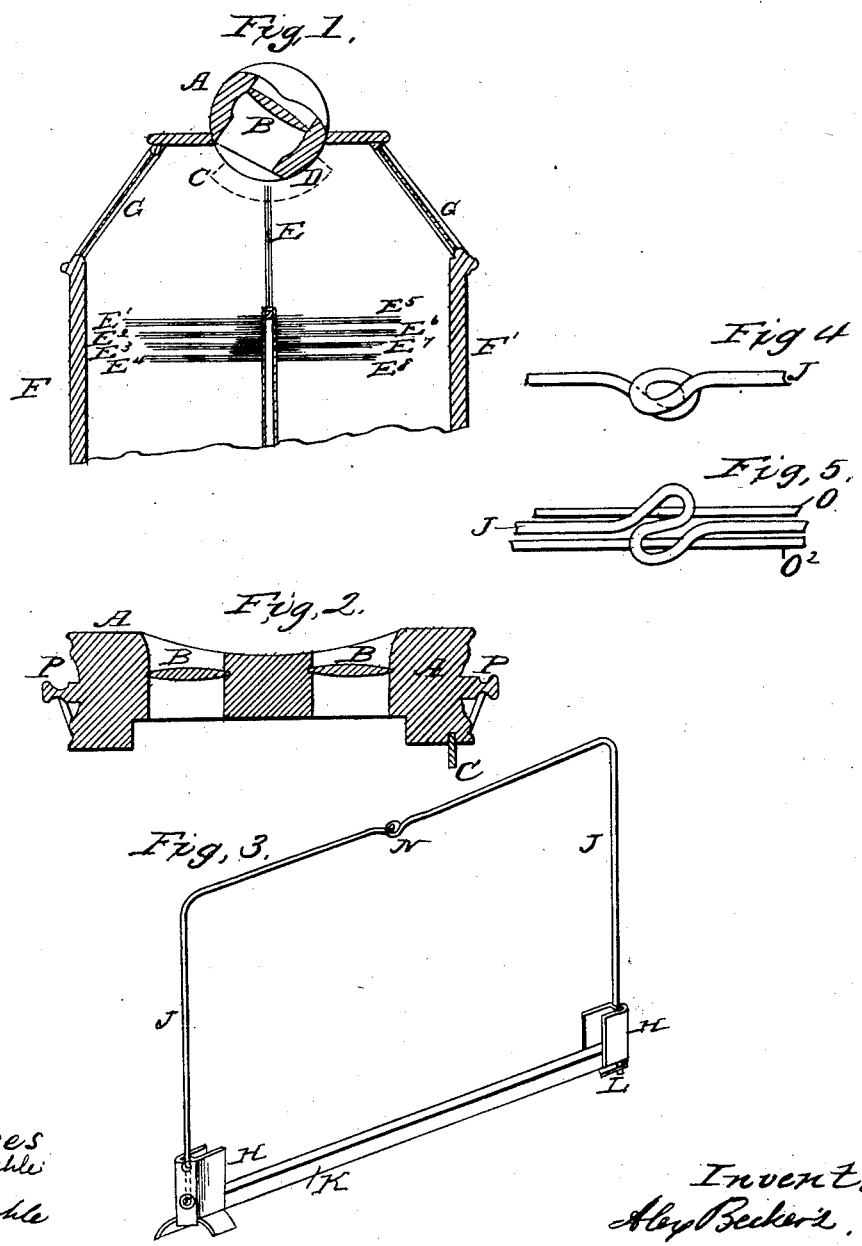

UNITED STATES PATENT OFFICE.

ALEXN. BECKERS, OF NEW YORK, N. Y.

STEREOSCOPIC INSTRUMENT.

Specification of Letters Patent No. 24,855, dated July 26, 1859.

*To all whom it may concern:*

Be it known that I, ALEXANDER BECKERS, of the city, county, and State of New York, have invented a new and useful Improvement in Stereoscopic Instruments for the Exhibition of Stereoscopic Pictures; and I do hereby declare that the following is a full, clear, and exact description thereof, reference being had to the annexed drawings, making part of this specification, in which—

Figure 1 is a vertical cross section of the instrument. Fig. 2 is a vertical longitudinal section. Fig. 3 is a perspective view of the construction of the picture frames. Fig. 4 is an elevation of the double hook of the picture frame in an enlarged scale. Fig. 5 is a horizontal view of the same.

Similar letters of reference indicate corresponding parts in these figures.

The nature of my invention consists in providing the stereoscopic instrument with a movable eyeglass-case and with improved picture holders or frames as hereinafter described.

To enable others skilled in the art to make and use my invention I will proceed to describe its construction and operation.

Letters Patent of the United States having been granted to me for an apparatus for exhibiting stereoscopic pictures dated the seventh day of April 1857, and Letters Patent having also been granted to me on improvements on the said apparatus dated severally April the 5th, 1859, April the 12th 1859 and March 29th 1859, I hereby make reference to the said Letters Patents for the purpose of a description of the general construction of the said apparatus.

My present improvements relate to the construction of the upper part of the case, in placing the eyeglasses in a movable cylinder in such a manner that opaque pictures placed back to back may be viewed by the same pair of eyeglasses; the direction of the said eyeglasses being altered by the partial rotation of the cylinder to suit the opposite position of the pictures, and the window glasses being situated on the opposite sides of the case in suitable angles.

My present improvements also relate to the picture holders, which are constructed in such a manner that two pictures may be adjusted in one holder advantageously.

In the annexed drawings A A represents the eyeglass cylinder which is flattened on the top toward the center and pierced by two openings B B for the eyeglasses or lenses.

E, E', $E^2$ $E^3$, $E^4$, $E^5$, $E^6$, $E^7$, $E^8$ represent the frames or holders containing the pictures, which are placed on the endless belt moving on rollers as described in the patents referred to.

Each picture holder or frame consists of a square wooden base K to each end of which two thin metallic casings H, H are attached. To these casings the thin elastic wire J is fastened, the upper part of which is formed into a double hook N in such a manner that one hook projects on one side and the other hook on the opposite side of the plane formed by the wire J. Thus each frame may be securely adjusted to two pictures O' and $O^2$; by the double hook N overlapping both pictures. At L L on the lower ends of the bar K each picture frame is secured to the endless belt or chain. The construction of these frames is fully shown in Figs. 3, 4 and 5.

The cylinder A is provided with a pin $c$ working in a groove C D of the frame F G. The said groove being concentrical to the periphery of the cylinder it will admit of the position of Fig. 1, affording a view of the pictures placed at one side of each frame J, for instance of all the pictures, the position of which is marked O' (in Fig. 5) or it will admit of a position where the pin $c$ will be near D and where the pictures indicated by $O^2$ will come into view. The pictures being placed in each frame back to back, the same may be exhibited by leaving the cylinder A in the position as shown in Fig. 1, until all the pictures marked O' have come successively into view, then the cylinder A is so turned that its pin $c$ should be near D, when all the pictures indicated by $O^2$ will be exhibited.

The light is admitted by two windows G and G on opposite sides of the box in such a manner that the windows G G should be nearly parallel with, or perpendicular to the plane of the lenses.—The cylinder A is secured to the box by elastic bands P attached to the frame of the box.

Having thus described my invention and the manner of using the same what I claim as new and desire to secure by Letters Patent is:

1. Placing the eyeglasses B in a movable cylinder A in such a manner that opaque pictures O' and O² placed back to back may be viewed by the same pair of eyeglasses, the direction of the said eyeglasses being varied by the partial rotation of the cylinder to suit the opposite position of the pictures substantially as described.

2. The construction of the picture holders with a double hook N substantially as described.

Dated New York June 16, 1859.

ALEX. BECKERS.

Witnesses:
 SETH WEHLE,
 JULIUS WEHLE.